United States Patent [19]

Clark et al.

[11] Patent Number: 5,406,544
[45] Date of Patent: Apr. 11, 1995

[54] LOW COST SUBSTRATE FOR BUMP-FORMING RECORDING MEDIA

[76] Inventors: Bryan K. Clark, 254 Jackson St., Sunnyvale, Calif. 94086; Stephen D. Pacetti, 110 E. Remington Dr., #35, Sunnyvale, Calif. 94087

[21] Appl. No.: 735,961

[22] Filed: Jul. 25, 1991

[51] Int. Cl.$^6$ .................................. G11B 11/03
[52] U.S. Cl. .............................. 369/275.3; 369/272; 369/283
[58] Field of Search .................... 369/275.1–275.4, 369/272, 274, 283, 284

[56] References Cited

U.S. PATENT DOCUMENTS

| | | | |
|---|---|---|---|
| 4,374,077 | 2/1983 | Kerfeld | 264/1.4 |
| 4,398,203 | 8/1983 | Cornet | 346/135.1 |
| 4,430,659 | 2/1984 | Maffitt et al. | 369/284 |
| 4,527,173 | 7/1985 | Gupta et al. | 346/135.1 |
| 4,578,788 | 3/1986 | Ahn et al. | 369/284 |
| 4,645,712 | 2/1987 | Ishigaki et al. | 428/433 |
| 4,647,947 | 3/1987 | Takeoka et al. | 369/284 |
| 4,651,172 | 3/1987 | Watanabe et al. | 430/913 |
| 4,673,626 | 6/1987 | Takeda et al. | 430/14 |
| 4,680,458 | 7/1987 | Drexler | 428/209 |
| 4,709,363 | 11/1987 | Dirks et al. | 369/288 |
| 4,710,452 | 12/1987 | Raychaudhuri | 430/495 |
| 4,725,502 | 2/1988 | Kiyomiya et al. | 428/457 |
| 4,773,059 | 9/1988 | Minemura et al. | 369/288 |
| 4,780,867 | 10/1988 | Lind et al. | 369/284 |
| 4,798,785 | 1/1989 | Pan et al. | 430/495 |
| 4,825,430 | 4/1989 | Halter et al. | 369/284 |
| 4,852,077 | 7/1989 | Clark et al. | 369/284 |
| 4,879,709 | 11/1989 | Clark | 369/284 |
| 4,896,314 | 1/1990 | Sklens et al. | 369/275 |
| 4,948,715 | 8/1990 | Hulme-Lowe et al. | 430/495 |
| 5,077,725 | 12/1991 | Nakayama et al. | 369/275.2 |

FOREIGN PATENT DOCUMENTS

| | | |
|---|---|---|
| 1229410 | 11/1987 | Canada . |
| 0136070 | 4/1985 | European Pat. Off. . |
| 0263641 | 4/1988 | European Pat. Off. . |

OTHER PUBLICATIONS

"Why Extrusion Will Challenge Injection Molding For Manufacturing Optical Discs", (Nov. 1987), *Plastics Technology* pp. 13–16.

DeLancie "ComDisc Bets On Making a Good Impression", (Dec. 1987) *MIX* pp. 166–171.

Abbott, "Flexible Optical Data Storage Media: New Markets, New Challenges" Talk given at 2nd Annual Technology Opportunity Conference, S.F. Airport Hilton, Jul. 19–21, 1988.

Ravick, "New 'Paper' Multiplies Optical–Storage Potential," (Nov. 1989) *Laser Focus World,* pp. 46–54.

Hamada et al, "CD–Compatible Write-Once Disc With High Refractivity [sic]," (1989) *SPIE vol. 1078, Optical Data Storage Topical Meeting,* pp. 80–87.

Jipson et al., "Infrared Dyes for Optical Storage", (1981) *J. Vac. Sci. Technol.* 18: pp. 105–109.

Watkinson, *The Art of Digital Audio,* Chapter 13, pp. 440–486 (1988) Focal Press.

Hartman et al., "Erasable Bilayer Dye–Polymer Optical Recording Medium," pp. 155–158.

Hartman, "Digital Audio is Compact and Rugged," (Mar. 1984) pp. 35–39.

*Primary Examiner*—Paul M. Dzierzynski
*Assistant Examiner*—Don Wong
*Attorney, Agent, or Firm*—William A. Linnell

[57] ABSTRACT

Write-once and erasable recording media (1) and a method of manufacturing such media. According to one aspect of the invention, one or more active layers (26, 30) of the optical data storage medium is formed by spin-on techniques. According to this aspect of the invention, the material used in forming the active layer is formed before the formation of the center aperture (4) in the optical disc. This aspect of the invention provides a substantially smaller "wedge" than prior methods. According to one preferred aspect of the invention, tracking grooves (24) in a flexible sheet (22) are bonded to a substantially rigid substrate (18). The sheet is bound to the substrate such that the tracking marks are directed away from the substrate. The active layers of an optical recording media are then formed on the sheet by, for example, spin-on techniques.

4 Claims, 3 Drawing Sheets

LOW COST SUBSTRATE FOR BUMP-FORMING RECORDING MEDIA

BACKGROUND OF THE INVENTION

The present invention relates to the field of optical data storage. More specifically, in one embodiment the invention provides an improved method for making high quality, low cost optical data storage media and, in particular, high quality bump-forming media, especially erasable media.

Bump-forming, erasable optical recording media are well known. Examples of bump-forming, erasable recording media, methods of formation thereof, and methods of using such media are provided in U.S. Pat. Nos. 4,918,682 (Finegan), and 4,852,077 (Clark), as well as U.S. application Ser. No. 07/510,360 (Clark et al.), all of which are assigned to the assignee of the present invention and incorporated herein by reference for all purposes.

Write-once, CD compatible media are also known and produced by Taiyo Yuden and Mitsui Toatsu. The media are similar in that they both consist of three layers applied to a rigid, grooved substrate. Two of the layers are formed by spin coating. The third is a metal reflective layer formed by a vacuum deposition process.

Currently, the most common technique for manufacturing rigid optical media provides for the fabrication of such substrates one piece at a time on individual substrates. Layers of the media structure are formed by spin coating or vacuum deposition processes. The throughput is low because each disc is individually processed. The processing techniques, particularly spin coating, are wasteful of material. Spin coating onto a rigid substrate is commonly used for several reasons. First, it is amenable to prototype and small scale production. Secondly, the rigid substrate can be made to contain optical tracking information. This information is usually in the form of grooves, formed when the substrate was injection molded.

Often, it is necessary to form several layers of material on an optical data storage media such as the one described by Finegan, incorporated by reference above. These layers are put on in a step-wise fashion. The throughput is particularly low in such a process because for each layer, each substrate is coated individually with a spin cycle that lasts seconds to minutes. Moreover, spin coating is a wasteful process in terms of the coating solution. Most of the coating liquid is used to initially wet the substrate. The large majority of it is then spun off. Clever dispensing techniques and recovery of the spun off solution can minimize this waste. However, for a given area, spin coating continues to use substantial amounts of fluid.

Vacuum deposition of layers on an optical recording media has also been proposed. Similar throughput concerns apply to vacuum deposition processes as well. When vacuum deposition techniques are used, the media must be processed batchwise or held stationary under single coating stations.

It has also been found by the inventors herein that uniformity of the layers is impacted by piecewise processing. The substrates used in optical disc recording are typically injection molded from polycarbonate resin. As shown in prior art FIG. 1, the molding process creates a substrate 2 with a center hole 4 and a stamper ring groove 6 on the data side of the disc. The recording layers are typically coated onto the molded substrate using either vacuum deposition or spin coating processes. When spin coating recording layers, the inner diameter of the coating is affected by the diameter of the stamper ring groove and a coated/non-coated boundary condition is created. This boundary condition creates a substantial "ramp" in coating thickness such that the coating is thinner at the inner portion of the disc and thicker at the outer portion of the disc. Typically the larger the inner coating diameter the worse the wedge is for a given coating condition.

A process has been proposed for producing read-only compact discs at reduced cost as compared to standard injection molding techniques for such discs. The resulting disc structure is shown in prior art FIG. 2. An extruded polycarbonate sheet 8 is coated with a web 10 having a reflective layer 12 thereon. The web/reflective layer is connected to the polycarbonate sheet with an adhesive 14. Data marks 16 are pre-impressed into the web/reflective layer.

While prior media and methods of forming such media have met with substantial success, it is seen that an improved optical data storage media and method of forming such media is needed.

SUMMARY OF THE INVENTION

Improved write-once and erasable recording media, as well as a method of manufacturing such media are provided by virtue of the present inventions.

According to one aspect of the invention, an active layer of an optical data storage medium is formed by spin-on techniques. According to this aspect of the invention, the material used in forming the active layer is formed before the formation of the center hole in the optical disc. This aspect of the invention provides a substantially smaller "wedge" than prior methods. According to preferred aspects of the invention, this procedure is facilitated by forming tracking marks in a flexible sheet which is bonded to a substantially rigid substrate. The sheet is bound to the substrate such that the tracking marks are directed away from the substrate. One or more active layers of an optical recording media are then formed on the sheet by, for example, spin-on techniques. Preferably, the active layers are spun onto the sheet by depositing an active layer material in a liquid form onto the substrate substantially in the center thereof, spinning the substrate in a plane parallel to the substrate and, thereafter, punching the center drive hole in the substrate.

According to another aspect of the invention, the active layers of the media are formed by depositing onto a sheet such as a flexible polycarbonate sheet. The flexible sheet is then bound to a substrate, avoiding spin-on techniques altogether.

Accordingly, one embodiment of the invention includes a flexible sheet with tracking grooves on one side laminated to bump forming media. The laminated sheet is then bonded to a polycarbonate substrate.

According to another embodiment of the invention, the invention includes an optical recording media in which a substantially rigid substrate is bonded to a flexible sheet having tracking marks which face away from the substrate. The media also has an active material layer bonded to the flexible sheet in such a manner that the active layer material contacts the tracking marks on the flexible sheet.

A further understanding of the nature and advantages of the inventions herein may be realized by reference to the remaining portions of the specification and the attached drawings.

DESCRIPTION OF THE PREFERRED EMBODIMENTS

CONTENTS

Figure 1:
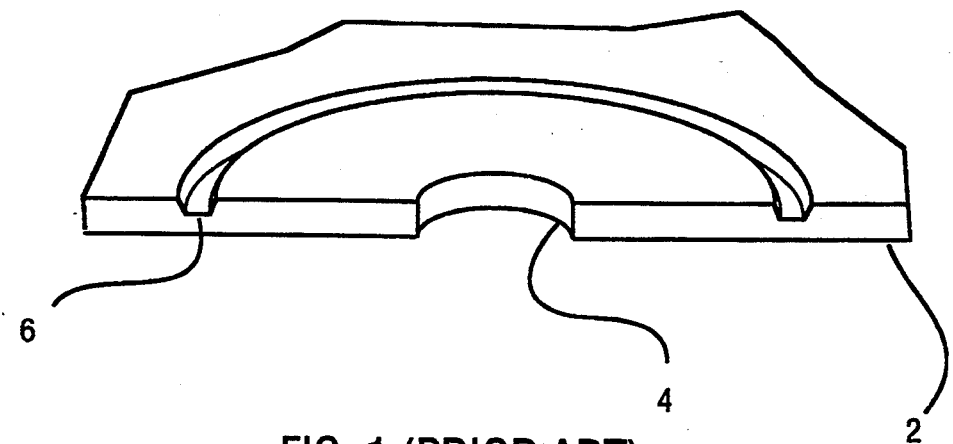
FIG. 1 is an isometric, cross-sectional view of a prior art optical data storage media substrate before application of active layers thereon.
Figure 2:
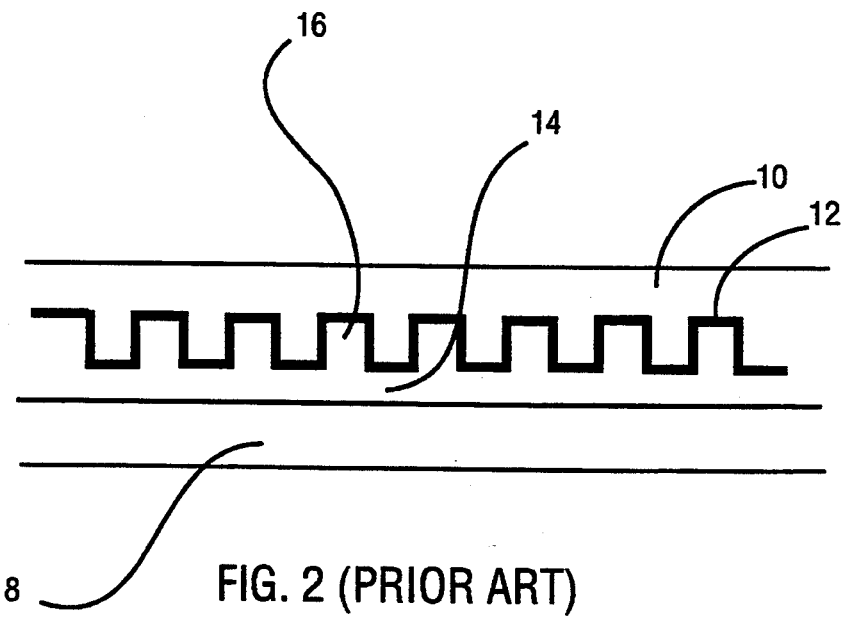
FIG. 2 is a cross-section of a prior art read-only media.

I. Introduction
II. Spin Coating/Lamination Manufacturing Process
III. Lamination Process
IV. Conclusion

I. Introduction

The present invention provides an improved technique for forming write-once and erasable optical media such as bump-forming media, as well as improved optical data recording media themselves. According to one aspect of the invention, a substantially rigid substrate is provided. A film containing tracking and/or focus signal marks is applied to the substrate, with the tracking marks facing away from the substrate. Spin coating is then utilized to apply active layers to the film, such active layers including, for example, expansion and/or retention layers. By "active layer" it is intended to mean herein a layer which will have a physical characteristic changed upon application of a light beam, the change in the physical characteristic detectable upon application of a read beam of light. A primary example of such active layers are expansion and retention layers used in bump-forming media, although other active layers such as ablative and magneto-optic layers will be used according to some embodiments. Bump-forming layers are disclosed in U.S. application Ser. No. 07/510,360, previously incorporated herein by reference. According to another aspect of the invention, the active layers, especially the expansion and/or retention layers in a bump-forming media are also applied as a laminate on a flexible sheet.

II. Spin Coating/Lamination Manufacturing Process

Most recordable media require the substrate to have a grooved or similar type of structure to provide a tracking signal and/or focus signal to the recorder. According to one embodiment of the invention, this information is pressed onto a thin, clear material such as a polycarbonate web or sheet. The web is preferably index-matched to polycarbonate or other substrate material. Other suitable materials for the substrate include glass, PMMA, polystyrene, aliphatic hydrocarbon compounds, various co-polymers, and other materials, and in each embodiment the sheet is preferably index-matched to the substrate. According to a preferred embodiment of the invention, the web is laminated to the substrate with the formatted surface facing away from the substrate. The inner hole and/or outer circumference is then cut by a laser or other means and the substrate is then ready for further application of an active layer for a recordable or rewritable optical media such as a bump-forming media.

An important feature of this process occurs in the manufacturing of spin-coated optical media. In this case the center hole is not cut until after the spin coating steps have been completed. This results in two large benefits:

1) On-center dispensing can be used which allows for faster cycle times and the use of less raw materials resulting in a reduction in process costs.

2) With on-center dispensing the inner coating boundary disappears and the coating wedge is almost completely eliminated. It has been extremely difficult to achieve uniform record performance across a given disc due to the coating wedge, so the elimination of a coating wedge will have a dramatic affect on recording performance. On-center dispensing will also make it easier to achieve batch-to-batch uniformity.

Another benefit is that the web material is not required to be polycarbonate and therefore, alternative materials which might be less temperature or more solvent resistant could be used such as mylar, polyesters, polyethylene and polypropylene. The web material is preferably flexible, i.e., sufficiently compliant that it may be rolled without damage. Many of the difficulties in creating an optical media deal with substrate problems. The one major requirement of any web material is that when laminated to the polycarbonate substrate it does not dramatically affect the optical performance of the substrate. Accordingly, preferred web materials should be free of bubbles and pinholes, and should not be birefringent. In many materials, birefringence can be avoided by employing materials that do not have anisotropic internal stresses. Once again, the web material would need to match the index of refraction of the substrate or have very little effect on the optical path. It is also preferred that the adhesive be substantially index matched to the substrate. Preferred adhesives include those commonly available for high quality optical applications. In addition, a thermal welding technique could be employed to join the substrate and web material.

Figure 3A:
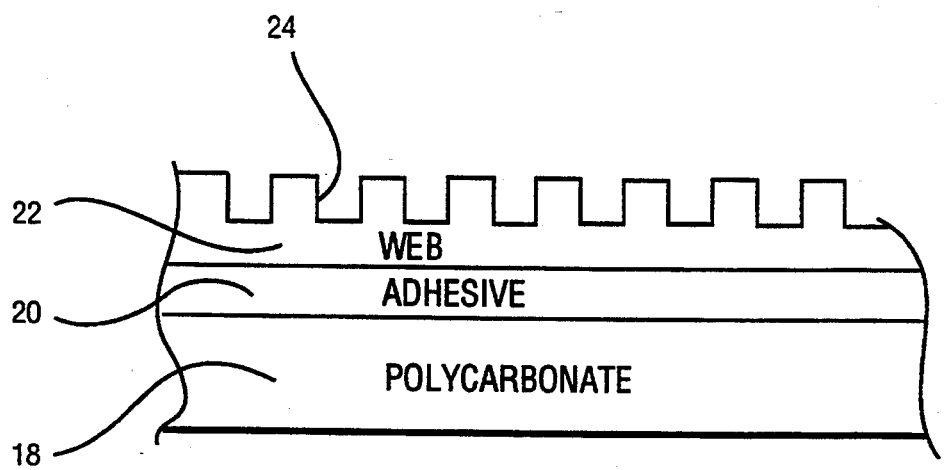
FIGS. 3a to 3d illustrate a process for forming an erasable media according to one aspect of the invention.

FIG. 3 illustrates a preferred method of making an erasable, bump-forming optical recording media 1 according to one embodiment of the invention and, in particular, FIG. 3a shows the media at a first stage of fabrication. In most instances, the disk has previously been cut around the perimeter. The invention provides for the use of a substrate material 18 such as an extruded polycarbonate sheet. The sheet is coated with a suitable, index-matched adhesive layer 20 which is used to hold web 22 to the substrate. Web 22 is, in preferred embodiments, an index-matched layer (such as another polycarbonate layer) which contains impressed tracking grooves 24, which may also be used for stylus focus correction. By "web" it is intended to mean herein a sheet of material which is preferably sufficiently flexible that it may be easily rolled and applied to the substrate material. Various forms of tracking grooves or marks and their operation are well known and described in, for example, Marchant, *Optical Recording—A Technical Overview*, 1990, which is fully incorporated herein by reference for all purposes. As will be obvious to those skilled in the art, the scale of these marks is greatly exaggerated in the figures for purposes of illustration.

Figure 3B:
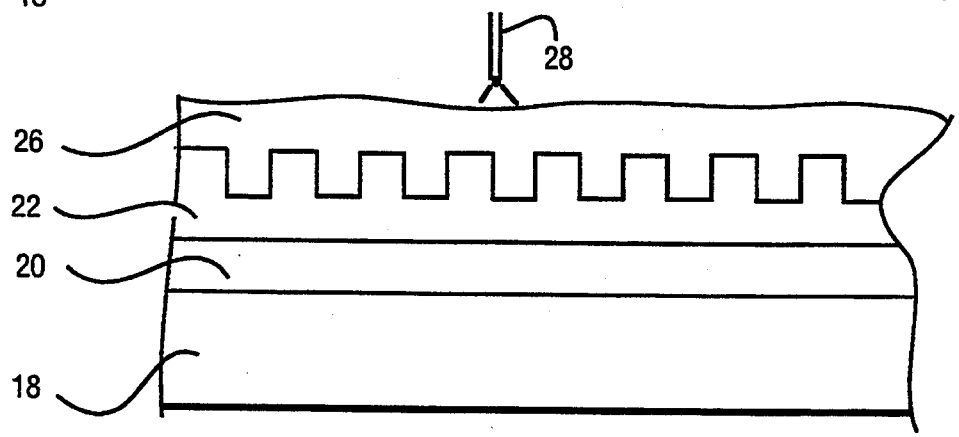

FIG. 3b shows the media at the next stage of fabrication. As shown, a first active layer 26 is applied to the web as a liquid from dispensing location 28 using means well known to those skilled in the art. Preferably, the media is spun simultaneously with application of the active layer 26 so as to provide a smooth layer of active material. In a preferred embodiment, the active layer is an expansion layer made from one or more of the materials disclosed in application Ser. No. 07/510,360, now U.S. Pat. No. 5,036,511, previously incorporated herein by reference. Preferably, the material is applied to the media substantially in the center of the substrate. By "substantially in the center" it is intended to mean within about ±10% of the radial or diagonal center of the to-be-formed media. The active layer should not vary in thickness by more than about 8% and preferably by not more than about 1%.

Figure 3C:
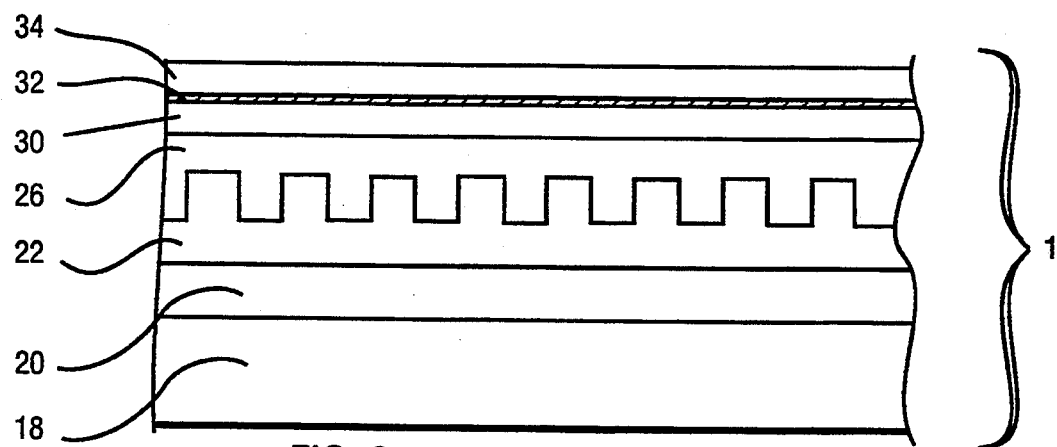

Thereafter, as shown in FIG. 3c, an optional, second active layer 30 is then applied to the media in a similar fashion, also using spin coating techniques. Additional layers may also then be applied such as a reflective layer 32 and protective layer 34.

Figure 3D:
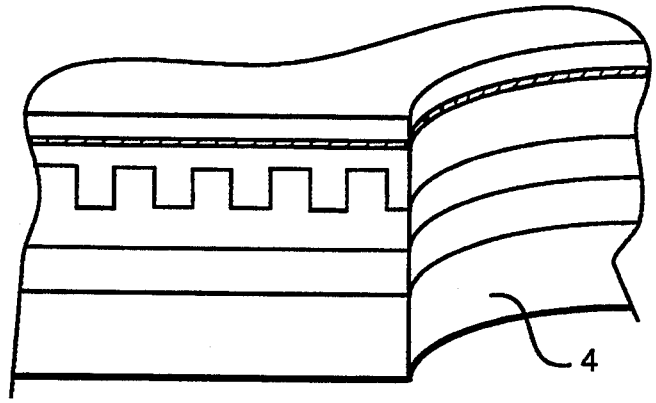

Thereafter, as shown in FIG. 3d, a center aperture or hole 4 is then punched, cut by a laser, or the like, in the center of the media. If necessary, the outside portion of the media is cut in the form of a disc at this time, although the outside portion of the disc may be cut at an earlier stage of the fabrication process.

According to another embodiment of the invention, a previously stamped substrate material is used in place of the web and substrate combination shown in FIG. 3. In this embodiment, a stamper impresses the tracking grooves used for stylus focus correction. Thereafter the active layers are applied and the coated aperture is punched as described in the preferred embodiment.

The following examples are provided to illustrate the invention and not as limiting the scope thereof.

EXAMPLE 1

Effect of Center Hole, Dispense Speed, and Spinner Acceleration on the Coating Uniformity Typically, spin coated active layers are applied in three steps. First, the disk is rotated at a fixed speed while the polymeric material used as a coating is dispersed as a fluid onto the disk. Then after the fluid dispensing is complete, the disk is accelerated to a second speed. Finally, the disk rotation is held at the second speed for a length of time, preferably 3 to 7 seconds, known as "spin time".

It was observed by the inventors herein that polymer coatings in a bump-forming media have a consistent, radial variation in film thickness where the film is thinnest at the inner edge and increases at larger radii. Media with a spin coated expansion layer were used to check the effect of several coating variables on the magnitude of the coating "wedge." The variables tested were:

fluid dispense speed
spinner acceleration
effect of center hole

These processing variables were changed one at a time, with at least two discs coated under each set of conditions. Table 1 lists each of the discs, their treatment conditions, and the resulting wedge magnitudes. Starting with the standard conditions listed below, a change was made within each set and is listed under "Coating Variable."

The standard conditions were:
40 rpm dispense speed
1.5-second acceleration (2000 rpm/sec)
3000 rpm spin speed
5-second spin time After curing, the absorbance at 680 nm was measured for every disc at four different radii. At each radii, at least three readings were taken circumferentially around the disc and the results averaged. The dispense volume was constant. The "% Thickness Wedge" was calculated by taking the difference in absorbance at 23.5 and 46.7 mm and dividing by the average.

TABLE 1

Effect of Some Processing Variables on the Wedge

| Disc | Coating Variable | 680 Absorbance at Different Disc Radii (mm) | | | | % Thickness Wedge 23.5–46.7 mm |
|---|---|---|---|---|---|---|
| | | 23.5 | 27.0 | 32.5 | 46.7 | |
| 1 | standard | 0.164 | 0.174 | 0.187 | 0.198 | 19 ± 1 |
| 2 | standard | 0.165 | 0.175 | 0.189 | 0.198 | 18 ± 1 |
| 3 | 0.25 sec acceleration (12,000 rpm/sec) | 0.157 | 0.171 | 0.187 | 0.198 | 23 ± 1 |
| 4 | 0.25 sec acceleration (12,000 rpm/sec) | 0.157 | 0.171 | 0.184 | 0.195 | 22 ± 1 |
| 5 | 5.0 sec acceleration (600 rpm/sec) | 0.189 | 0.189 | 0.197 | 0.205 | 8 ± 1 |
| 6 | 5.0 sec acceleration (600 rpm/sec) | 0.192 | 0.192 | 0.201 | 0.210 | 9 ± 1 |
| 7 | 200 rpm dispense | 0.165 | 0.176 | 0.187 | 0.198 | 18 ± 1 |
| 8 | 200 rpm dispense | 0.168 | 0.179 | 0.191 | 0.201 | 18 ± 1 |
| 9 | 800 rpm dispense | 0.160 | 0.173 | 0.186 | 0.199 | 22 ± 1 |
| 10 | 800 rpm dispense | 0.159 | 0.171 | 0.185 | 0.197 | 21 ± 1 |
| 11 | flat, no hole | 0.221 | 0.219 | 0.221 | 0.223 | 1 ± 1 |
| 12 | flat, no hole | 0.221 | 0.220 | 0.221 | 0.223 | 1 ± 1 |
| 13 | flat, no hole | 0.223 | 0.221 | 0.222 | 0.223 | 0 ± 1 |
| 14 | flat, no hole | 0.221 | 0.221 | 0.222 | 0.223 | 1 ± 1 |
| 15 | flat, no hole | 0.222 | 0.221 | 0.222 | 0.223 | 0 ± 1 |

Three acceleration rates of 0.25 (12,000 rpm/sec), 1.5 (2,000 rpm/sec) (standard), and 5 (600 rpm/sec) seconds were tried. The 0.25-second data shows a larger wedge while the discs with the 5-second acceleration have a wedge which is 50% smaller than the standard disc. Accordingly, it is seen that acceleration rates of less than 2,000 rpm/sec are desired, preferably less than 1,500 rpm/sec, more preferably less than 1,000 rpm/sec, and most preferably less than about 600 rpm/sec. Three different fluid dispense speeds were used, 200, 400 (standard), and 800 rpm. Two hundred and 400 rpm speeds give roughly the same results, but the 800 rpm discs are less uniform.

The effect of the hole in the center of the disc is also illustrated. Coating substrates with no center hole results in a more uniform film. Suitable test substrates were fabricated by a using a "Tufac" polycarbonate sheet from Rhom and Haas. This sheet does not have an optically smooth surface. Consequently, the coatings had many pinholes. However, the number of coating defects was not sufficient to substantially impact absorbance measurements. Within the accuracy of the measurement, these discs had no wedge.

EXAMPLE 2

Film Thickness Measurements Using A Profilometer

Film thickness measurements were made with a Dectak IIA stylus profilometer. This instrument measures the film thickness by dragging a small stylus across a clean step made in the film. For this purpose, several 120 mm glass substrates were coated with expansion or retention films. A glass substrate was used because reliable steps can be made by simply scratching the coating with a scalpel. Thickness measurements were made at 5 mm intervals along the disc radii. Since the films were not measured at the same radii, the results were graphed and used to interpolate the thicknesses for radii specified in Table 2.

Comparing all of the coatings done on glass to the equivalent ones done on polycarbonate, the coatings on glass are slightly thinner. For the expansion layer, the polycarbonate disc's wedge is similar but for the half thickness coating, the glass is worse. The retention layers on glass also have a larger wedge. The reason for this is not fully understood. It is an experimental fact that it was more difficult to get the glass to wet during the dynamic dispense than the polycarbonate. On glass, the droplets of coating solution would roll off the disc without breaking. Therefore, it is possible that the coating thicknesses and their uniformity are affected by the dispense and/or material of the substrate. The data obtained on glass substrates do, however, provide good qualitative evidence that the center deposition technique results in more uniform active layers.

EXAMPLE 3

Inner Coating Radii

To further explore the impact of inner application radius, coatings with different inner coating radii were made on glass substrates. The film thicknesses and wedge of these discs were measured with a stylus profilometer. It was found that the closer to the center the coatings began, the more uniform the coatings were over the recording region. Discs with no center hole had no discernable wedge. The region of the disc which

TABLE 2

Stylus Profilometer Data from ODI

| Disc | Coating Type | Thickness (μm) at Disc Radii (mm) | | | | % Thickness Wedge 23–53 mm |
|---|---|---|---|---|---|---|
| | | 23 | 33 | 43 | 53 | |
| Expansion Layers | | | | | | |
| 16 | standard | 0.91 | 1.02 | 1.06 | 1.11 | 20 ± 1 |
| 17 | coated to center hole | 1.06 | 1.10 | 1.13 | 1.16 | 9 ± 1 |
| 18 | half thickness | 0.40 | 0.46 | 0.50 | 0.54 | 30 ± 1 |
| Retention Layers (stoichiometric) | | | | | | |
| 19 | standard | 0.34 | 0.49 | 0.54 | 0.58 | 52 ± 1 |
| 20 | half thickness | 0.23 | 0.27 | 0.30 | 0.33 | 36 ± 1 |

At first glance, these wedges seem quite large. The retention layer wedge was worse than the expansion layer wedge. However, coating up to the center hole does improve the uniformity and makes the film thicker. Since only five discs were used and it was difficult to fully wet the discs during the dispense, the validity of these results were tested using absorbance measurements taken with these glass discs and polycarbonate discs with the same coatings.

is recorded is defined in the CD specifications. It ranges roughly from 23 mm to 58 mm. By starting the coating closer to the center, the coating in the recorded area tends to be more uniform.

Although film absorbance is generally proportional to the film thickness, the only completely reliable technique for determining absolute film thicknesses is the stylus profilometer. In order to use this instrument though, the coatings must be on glass substrates. To

TABLE 3

Absorbance Data at 680 mm for Coated Glass Discs and the Equivalent Coatings on Polycarbonate Discs

| Disc | Coating Type | 680 Absorbance at Different Disc Radii (mm) | | | | % Thickness Wedge 27.0–46.7 mm |
|---|---|---|---|---|---|---|
| | | 23.5 | 27.0 | 32.5 | 46.7 | |
| Expansion Layers | | | | | | |
| 21 | polycarbonate substrate | 0.164 | 0.174 | 0.187 | 0.198 | 19 ± 1 |
| 16 | glass substrate | 0.146 | 0.160 | 0.168 | 0.178 | 20 ± 1 |
| 17 | coated to centr, glass | 0.082 | 0.087 | 0.095 | 0.099 | 7 ± 1 |
| 22 | ½ thick on polycarb. | 0.082 | 0.087 | 0.095 | 0.099 | 19 ± 1 |
| 18 | ½ thick on glass | 0.068 | 0.075 | 0.079 | 0.087 | 25 ± 1 |
| Retention Layers (stoichiometric) | | | | | | |
| 19 | glass substrate | 0.114 | 0.144 | 0.163 | 0.174 | 42 ± 1 |
| 20 | almost ½ thick on glass | 0.095 | 0.105 | 0.112 | 0.117 | 21 ± 1 |
| 23 | polycarbonate substrate | 0.155 | 0.165 | 0.174 | 0.185 | 21 ± 1 |
| 24 | polycarbonate substrate | 0.163 | 0.175 | 0.184 | 0.194 | 17 ± 1 | evaluate what the wedge currently is, and to measure the effect of the inner coating radius, glass substrates were coated with either expansion or retention films.

Four different inner radii were coated, with two discs at each radii for each type of coating, a total of sixteen discs in all. Thicknesses were measured every 5 mm along the disc radius. For each type of disc, the pairs of data were averaged. The results are provided in Table 4.

TABLE 4

Coating Wedge as A Function of Type and Inner Radius

| Type | Inner Coating Radius (mm) | % Thickness Wedge 23–58 mm |
| --- | --- | --- |
| Expansion | 19 | 12 ± 1 |
| Expansion | 13 | 11 ± 1 |
| Expansion | 8 | 9 ± 1 |
| Expansion | 0, no hole | −1 ± 1 |
| Retention | 19 | 18 ± 1 |
| Retention | 13 | 12 ± 1 |
| Retention | 8 | 8 ± 1 |
| Retention | 0, no hole | 1 ± 1 |

Nineteen millimeters is the inner radius when coating on Disctronics substrates. Thirteen millimeters is the corresponding number when Shape substrates are used. Eight millimeters is with the coating right up to the center hole.

Unfortunately, the coating quality was below average. Glasstech substrates were used here for the first time and it was found that they do not coat as well as the Hoya glass substrates. Whether this is due to the discs being inherently rougher or just dirtier has not been shown. Fortunately, the averaged data are still useful. In Table 4, the % wedge is calculated as the difference in thickness at 23 and 58 mm divided by the average thickness. We see that the farther in the coatings begin, the more uniform they are over the recording region.

III. Lamination Process

According to a preferred embodiment of the invention, a flexible film is coated with active areas of an erasable media structure and then laminated to a rigid substrate. Expansion and retention layers, for example, are coated onto a web when a bump-forming media is to be formed. According to a preferred embodiment, this technique is combined with the first embodiment to create the groove pattern in the flexible substrate necessary for optical tracking.

After the flexible film is laminated to the rigid substrate sheet, the inner hole and outer radius are laser cut to produce the finished media. Higher throughput will be realized for a given capital expenditure compared to spin coated processing. More efficient use of the coating fluids, and use of an embossed film for the tracking information, instead of a precision injection molded rigid substrate, will result in substantial cost savings.

In some embodiments, conventional roll coating techniques are used to apply the various layers such as the expansion and retention layers to a film. However, thinner dye layers in some embodiments are not easily formed by conventional roll coating techniques. Therefore, web coating technologies such as slot coating, spray coating, or sublimation in a vacuum are used in some embodiments. Dye layers of this thickness have been successfully applied by sublimation. Deposition of metal films onto a web is routine in several industries. One example is, "Digital Paper" made by ICI, and window glazing.

The active layer in magneto-optic recording media is environmentally sensitive. Consequently, the layering, laminating, and cutting operations need to leave the hermetic seal of the active layer intact. When sputtering techniques or the like are used to apply the active layer to a film, for a given capital cost, it is apparent that a web moving continuously through different sputtering regions would have higher throughput.

Figure 4A:
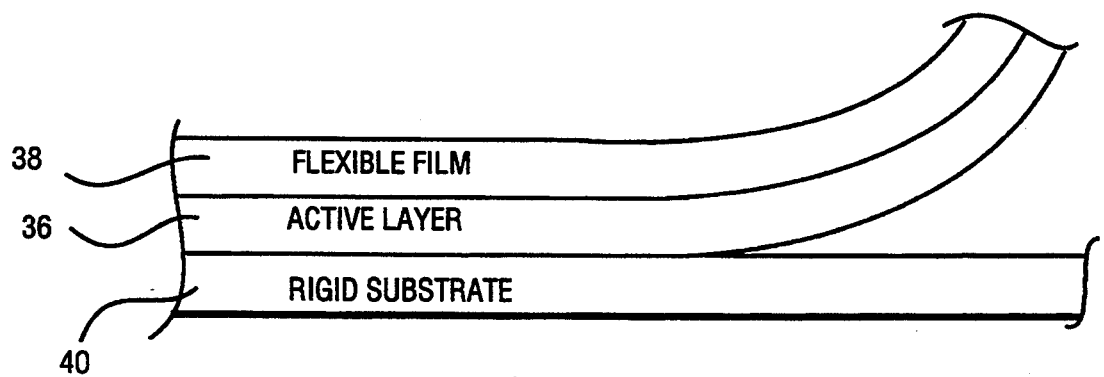
FIGS. 4a to 4b illustrate a process for forming a write-once or erasable media according to another aspect of the invention.
Figure 4B:
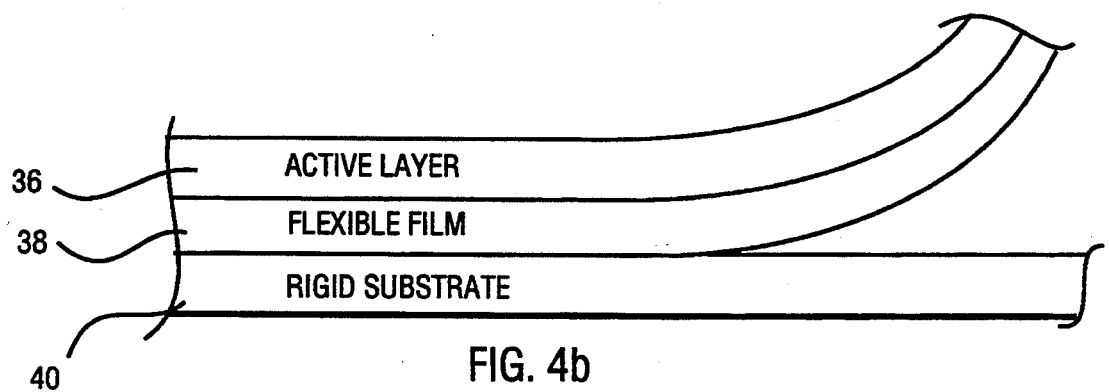

In general, web coated media disclosed herein may be formed in either one of two ways. In a first alternative, illustrated in FIG. 4a, the active layer structure 36 is layed onto the substrate between the flexible film 38 and the rigid substrate 40. In a second embodiment, illustrated in FIG. 4b, the active layer 38 is layed onto the substrate on the side of the flexible opposite film from the rigid substrate. In either case, the active material should be deposited adjacent to the tracking grooves so that the laser beam remains on track during writing operations. Of course, FIGS. 4a and 4b are simplified, and there may be other layers present such as an adhesive layer, a reflective layer, and/or a protective layer. A further advantage of this structure is the improved tracking signal due to the conformal metallization of the groove pattern in the flexible film.

Figure 5:
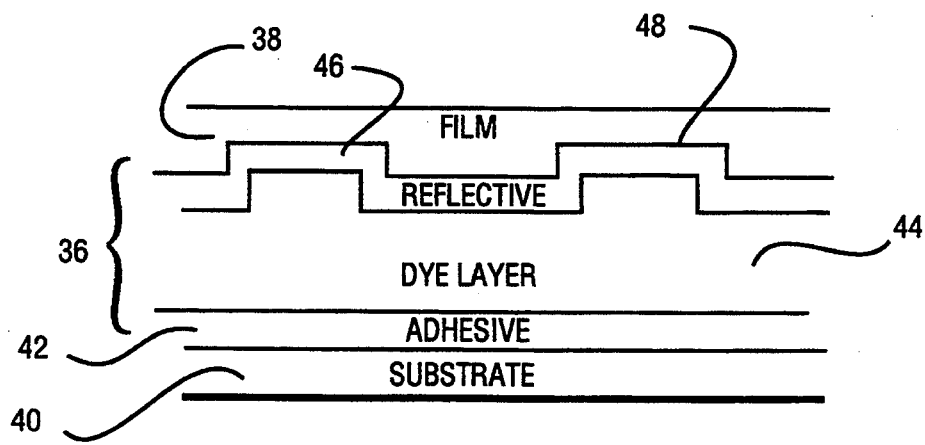
FIG. 5 illustrates a cross-section of a completed write-once media according to one aspect of the invention.

FIG. 5 illustrates a specific example of a media formed with a similar structure in which the active layer is placed between the flexible film and the rigid substrate. The particular embodiment shown in FIG. 5 is an adaptation of a write-once media currently available from Taiyo Yuden or Mitsui Toatsu. As shown, the media includes a rigid substrate 40 onto which a flexible film 38 has been deposited, the flexible film having an active layer 36 formed thereon. The active layer 36 is bound to the substrate with an adhesive 42. In this case, the active layer 36 includes a dye layer 44 and a reflective layer 46. The flexible film includes pre-pressed tracking grooves or marks 48.

IV. Conclusion

The above description is illustrative and not restrictive. Many variations of the invention will become apparent to those skilled in the art upon review of this disclosure. Merely by way of example, the invention has been illustrated primarily with regard to bump-forming media, but the invention is not so limited and could be utilized in conjunction with write-once or magneto-optic materials, such as those described in Marchant, previously incorporated herein by reference. The scope of the invention should, therefore, be determined not with reference to the above description, but instead should be determined with reference to the appended claims along with their full scope of equivalents.

What is claimed is:

1. An optical storage media comprising:
 a) a rigid substrate;
 b) a retention layer bonded to said rigid substrate;
 c) an expansion layer bonded to said retention layer; and
 d) a flexible layer having tracking marks therein bonded to said expansion layer such that said tracking marks face said expansion layer, said flexible layer having an index of refraction that is substantially identical to an index of refraction of said rigid substrate.

2. An erasable optical storage media comprising:
 a) a rigid substrate;
 b) a first flexible layer bonded to said rigid substrate;
 c) a retention layer bonded to said first flexible layer;

d) an expansion layer bonded to said retention layer; and e) a second flexible layer having tracking marks bonded in intimate contact with said expansion layer such that said tracking marks face said expansion layer, said second flexible layer having an index of refraction substantially identical to an index of refraction of said rigid substrate.

3. Optical storage media comprising:

a) a rigid substrate;

b) a flexible layer having tracking marks, said flexible layer bonded to said rigid substrate such that said tracking marks face away from said rigid substrate;

c) an expansion layer bonded to said flexible layer; and d) a retention layer bonded to said expansion layer; wherein said flexible layer has an index of refraction substantially identical to an index of refraction of said rigid substrate.

4. An optical storage media comprising:

a) a rigid substrate;

b) a flexible layer having tracking marks bonded to said rigid substrate such that said tracking marks face away from said rigid substrate, said flexible layer having an index of refraction substantially identical to an index of refraction of said rigid substrate;

c) an expansion layer bonded to said flexible layer; and d) a retention layer bonded to said expansion layer.

* * * * *